United States Patent [19]

Blount

[11] 4,153,764

[45] May 8, 1979

[54] PROCESS FOR THE PRODUCTION OF POLYISOCYANATE ORGANIC SILICATE SOLID/CELLULAR SOLID PRODUCT

[76] Inventor: David H. Blount, 5450 Lea St., San Diego, Calif. 92105

[21] Appl. No.: 896,981

[22] Filed: May 5, 1978

Related U.S. Application Data

[63] Continuation-in-part of Ser. No. 663,924, Mar. 4, 1976, Pat. No. 4,097,424, which is a continuation-in-part of Ser. No. 599,000, Jul. 7, 1975, Pat. No. 4,072,637, which is a continuation-in-part of Ser. No. 262,485, Jul. 14, 1972, abandoned, which is a continuation-in-part of Ser. No. 71,628, Sep. 11, 1970, abandoned.

[51] Int. Cl.$^2$ .............................................. C08G 18/00
[52] U.S. Cl. ............................ 521/155; 260/18 TN; 260/841; 260/849; 521/86; 521/111; 521/137; 521/172; 521/173; 528/44; 528/80; 528/75; 260/14; 260/15
[58] Field of Search ............... 260/14, 15, 16, 18 TN, 260/841, 849; 521/111, 155, 86, 137, 172, 173; 528/44, 80, 75

[56] References Cited

U.S. PATENT DOCUMENTS

| | | | |
|---|---|---|---|
| 3,004,921 | 10/1961 | Stossel | 260/2.5 AK |
| 3,674,430 | 7/1972 | Illigen | 260/2.5 AK |
| 3,716,502 | 2/1973 | Loew | 260/2.5 BB |
| 3,956,466 | 5/1976 | Blount | 260/2.5 AK |
| 3,975,316 | 8/1976 | Villa | 260/2.5 AK |
| 3,981,831 | 9/1976 | Markusch | 260/2.5 AK |
| 4,072,637 | 2/1978 | Blount | 260/2.5 AM |
| 4,097,424 | 6/1978 | Blount | 260/2.5 A |

FOREIGN PATENT DOCUMENTS 2325090  11/1974  Fed. Rep. of Germany.

*Primary Examiner*—Melvyn I. Marquis

[57] ABSTRACT

Polyisocyanates are reacted chemically with an oxidated silicon compound to produce a polyisocyanate silicate prepolymer. The polyisocyanate silicate prepolymer will react with organic compounds to produce a polyisocyanate organic silicate solid/cellular solid product.

32 Claims, No Drawings

PROCESS FOR THE PRODUCTION OF POLYISOCYANATE ORGANIC SILICATE SOLID/CELLULAR SOLID PRODUCT

CROSS-REFERENCE TO RELATED APPLICATIONS

This Application is a continuation-in-part of my copending U.S. Patent Application Ser. No. 663,924, filed Mar. 4, 1976, now Pat. No. 4,097,424 which is a continuation-in-part of my earlier U.S. Pat. application Ser. No. 599,000, filed July 7, 1975 now U.S. Pat. No. 4,072,637, which is a continuation-in-part of my earlier U.S. Pat. Application No. 262,485, filed June 14, 1972, now abandoned, which is a continuation-in-part of my ealier U.S. Pat. Application No. 71,628, filed Sept. 11, 1970, now abandoned.

BACKGROUND OF THE INVENTION

This invention relates to a process for the production of polyisocyanate silicate prepolymers and polyisocyanate organic silicate solid/cellular solid products. The polyisocyanate silicate prepolymer will react chemically with many organic compounds and polymers, inorganic compounds, organic silicate compounds and polymers, and mixtures thereof to produce useful polyisocyanate organic silicate solid/cellular solid products.

The products produced by this invention may be utilized as thermal insulating material, noise insulating material, floatation materials in boats, shock-resistant packaging, cushions, as fiber, as coating agents, as fillers, as impregnating agents, as adhesives, as casting material, as putty material, as constructional components of a building, etc. The products have improved heat and flame resistant properties. The products are novel and economical; some have wood-like physical properties. The products may be sprayed or mixed in place.

In the process according to the invention at least 4 components are used to produce the novel polyisocyanate organic silicate solid/cellular solid products as follows:

1. Component A: an oxidated silicon compound
2. Component B: an organic polyisocyanate or polyisothiocyanate
3. Component C: an organic amphiphilous compound
4. Compound D: a curing agent and/or activator

Component A

The oxidated silicon compounds may be produced by any of the commonly known methods in the arts. They are preferred to be in a fine granular form. The oxidated silicon compounds include hydrated silica, hydrated silica containing Si-H bonds (silicoformic acid), silica and natural occurring oxidated silicon compounds with free silicic acid groups. The hydrated silica includes various silicon acids such as dry silicic acid gel, orthosilicic acid, metasilicic acid, monosilandiol, polysilicoformic acid, orthosilicoformic acid (Leucone), silicoformic acid and silica sol. Hydraulic cements such as Portland cement, quick-setting cement, mortar cement, blast-furnace Portland cement, sulphate-resistant cement, brick cement, mild-burnt cement, natural cement, lime cement, gypsum cement, calcium sulfate cement, pozzolan cement, etc., contain oxidated silicon compounds and may be used in this invention. Hydrated silicate is the preferred oxidated silicon compound.

There are many different kinds of cement which may be used; in general, any mixture of fine ground lime, alumina and silica that will set to a hard product by admixture of water which combines chemically with the other ingredients to form a hydrate may be used. Detailed descriptions of the many kinds of cement which react with sand and rocks to produce concrete may be found in "Encyclopedia of Chemical Technology", Volume 4, Second Edition, Published by Kirk-Othmer, pages 684–710, as well as in other well known references in this field.

Component B

The polyisocyanate organic silicate solid/cellular solid products may be modified or improved by adding organic compounds, inorganic compounds, and/or organic-silicate compounds and polymers. These compounds may be added before the isocyanate, and the oxidated silicon compounds are reacted together, or they may be added after the polyisocyanate silicate prepolymer is produced. Organic polyols, polyesters, polyether glycols, organic polyol silicates, polyester silicates and polysulfides, polybutadiene, butadiene-styrene copolymers and butadiene-acrylonitrile copolymers which contain free hydroxyl groups may be used in this invention. These hydroxyl containing compounds, (polyols), polymers and copolymers may be first reacted with a polyisocyanate to produce a liquid isocyanate-terminated polyurethane prepolymer, and this may be used in this invention. The polyols may be reacted chemically with oxidated silicon compounds to produce organic hydroxy silicate compounds and their condensation products and may be used in this process. The method to produce the organic hydroxy silicate compounds and condensation products (polyester silicate polymers) may be found in U.S. Pat. Application No. 765,050, filed on Feb. 2, 1977, by David H. Blount. The oxidated silicon compounds may be first reacted with a polycarboxylic acid and/or a polycarboxylic acid anhydride to produce a silicic acid organic acid anhydride which may then be reacted with a polyol to produce a polyester silicate polymer which may be used in this invention.

Any suitable polyisocyanate or polyisothiocyanate may be used in this invention. For example, arylene polyisocyanates, such as tolylene, metaphenylene, 4-chlorophenylene-1, 3-, methylene-bis (phenylene-4-), biphenylene-4, 4'-, 3,3'-dimethoxybiphenylene-4,4'-; 3,3'-diphenylbiphenylene-4,4'-, naphthalene-1,5-, and tertrahydro-naphthalene-1,5-diisocyanates and triphenylmethane triisocyanate, alkylene polyisocyanates such as ethylene, ethylidine, propylene-1,2-, butylene-1,4-, butylene-1,3-, hexylene-1,6-, decamethylene-1,10-, cyclohexylene-1,2-, cyclohexylene-1,4-, and methylene-bis (cyclohexyl-4,4-) diisocyanates. Phosgenation products of aniline-formaldehyde condensation may be used such as polyphenyl-polymethylene, polyisocyanates. Polyisothiocyanates, inorganic polyisothiocyanates, polyisocyanates which contain carbodiimide groups as described in German Pat. No. 1,092,007 and polyisocyanates which contain urethane groups, allophanate groups, isocyanurate groups, urea groups, imide groups or biuret groups may be used to produce polyisocyanate silicate prepolymers or polyisocyanate organic silicate solid/cellular solid products. Mixtures of the above mentioned polyisocyanates may be used.

It is generally preferred to use commercial, readily available polyisocyanates such as toluene-2,4- and -2,6 diisocyanate and any mixture of these isomers, ("TDI"), ("crude MDI"), polyphenyl-polymethylene-isocyanates obtained by aniline-formaldehyde condensation followed by phosgenation, and modified polyisocyanates which contain carbondiimide groups, urethane groups, allophanate groups, isocyanurate groups, urea groups, imide groups or biuret groups, ("modified polyisocyanates").

Other polyisocyanates may be used in this invention such as polyisocyanates which contain ester groups such as listed in British Pat. Nos. 956,474 and 1,086,404 and in U.S. Pat. Nos. 3,281,378 and 3,567,763, polyisocyanate reaction products with acetals according to German Pat. No. 1,072,385 Polyisocyanates prepared by telomerization reactions as described in Belgian Pat. No. 723,640, polyphenyl-polymethylene polyisocyanates as described in British Pat. Nos. 874,430 and 848,671 polyisocyanates which contain carbodiimide groups as described in German Pat. No. 1,092,007, perchlorinated arylpolyisocyanates such as those described e.g. in German Pat. No. 1,157,601, polyisocyanates which contain allophanate groups as described e.g. in British Pat. No. 994,890 and in Belgian Pat. No. 761,628, and the diisocyanates described in U.S. Pat. No. 3,492,330, polyisocyanates which contain biuret groups as described e.g. in German Pat. No. 1,101,394, in British Pat. No. 889,050 and in French Pat. No. 7,017,514, polyisocyanates which contain isocyanurate groups as described e.g. in German Pat. Nos. 1,022,789 and 1,027,394 and in British Patent Nos. 1,091,949, 1,267,011 and 1,305,036, polyisocyanates which contain acylated urea groups according to U.S. Pat. No. 3,517,139 and polyisocyanates which contain urethane groups as described e.g. in Belgian Pat. No. 752,261 or in U.S. Pat. No. 3,394,164. Mixtures of the above polyisocyanates maybe used. Organic polyisocyanates which are modified with ionic groups for example, with carboxyl and-/or carboxylate groups and/or sulphonic acid groups and/or sulphonate groups may be used with the polyisocyanates in this invention. Polyisocyanates may be reacted with alkali metal silicates such as sodium metasilicate pentahydrate, potassium metasilicate pentahydrate, dry granular crude sodium silicate, and dry granular lithium silicate to produce polyisocyanate alkali metal silicate prepolymer with terminal isocyanate groups or terminal alkali metal silicate groups and may be used with the polyisocyanates in this invention. The polyisocyanate is mixed with the dry granular alkali metal silicate then heated to 30° to 40° C. while agitating at ambient pressure for 10 to 30 minutes, thereby producing a polyisocyanate prepolymer. Any of the suitable non-ionic hydrophilically modified organic polyisocyanates may be used in this invention.

Suitable polyisocyanates such as the aromatic diisocyanates may be reacted with organic compounds which contain at least two hydrogen atoms capable of reacting with isocyanates, preferably with a molecular weight of generally, from 300 to about 10,000 and in the ratio of from 50–99 mols of aromatic diisocyanates with 1 to 50 mols of said organic compounds to produce isocyanate-terminated reaction products. It is preferred to use polyols (organic polyhydroxyl compounds), in particular compounds and/or polymer which contain from 2 to 8 hydroxyl groups, especially those with a molecular weight of from about 800 to about 10,000 and preferably from 1,000 to about 6,000, e.g. polyesters, polyethers, polythioethers, polyacetals, polycarbonates, or polyester amides containing at least 2, generally from 2 to 8, but preferably from 2 to 4 hydroxyl groups, of the kind known for producing homogeneous and cellular polyurethanes. Compounds which contain amino groups, thiol groups or carboxyl groups may be used. Polyhydroxyl compounds, (polyols) which already contain urethane or urea groups, modified or unmodified natural polyols, e.g. castor oil, carbohydrates and starches may also be used. Addition products of alkylene oxides with phenolformaldehyde resins or urea-form-aldehyde resins are also suitable for the purpose of the invention. Polybutadiene polymers with free hydroxyl groups, polysulfide polymers, polybutadiene-styrene copolymers and butadiene-acrylonitrile copolymer chains are also suitable for the purpose of the invention.

The hydroxyl group-containing polyesters (polyols) may be, for example, reaction products of polyhydric alcohols, preferably dihydric alcohols and polybasic, preferably dibasic carboxylic acids. The corresponding polycarboxylic acid anhydride or corresponding polycarboxylic acid esters of lower alcohols or their mixture may be used instead of the free polycarboxylic acids for preparing the polyesters. The polycarboxylic acid may be aliphatic, cycloaliphatic, aromatic, and/or heterocyclic and may be substituted, e.g. with halogen atoms and may be unsaturated. Examples include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. Any suitable polyhydric alcohol (polyol) may be used such as, for example, ethylene glycol, propylene-1,2-and-1,3-glycol, butylene 1,4-and-2,3-glycol, hexane-1, 6-diol, octane-1,8-diol, neopentyl glycol, cyclohexanedimethol-(1,4-bis-hydroxy-methyl-cyclohexane), 2-methyl-propane-1, 3-diol, glycerol, trimethylol propane, hexane-1,2,6-triol, butane-1,2,4-triol, trimethylol ethane, pentaerythritol, quinitol, mannitol, sorbitol, glucose, starches, fructose, cane sugar, dextrines, castor oils, methylglycoside, diethylene glycol, triethylene glycol, tetraethylene-glycol, polyethylene glycols, dipropyleneglycol, polypropylene glycols, dibutylene glycol and polybutylene glycols. The polyesters may also contain a proportion of carboxyl end groups. Polyesters of lactones, such as ε-caprolactone, or hydroxy-carboxylic acids, such as ω-hydroxy-caproic acid, may also be used.

The polyethers with at least 2, generally 2 to 8 and preferably 2 or 3 hydroxyl groups, used according to the invention are known and may be prepared, e.g. by the polymerization of epoxides, e.g. ethylene oxide, propyleneoxide, butylene oxide, tetrahydrofuran, styrene oxide, or epichlorohydrin, each with itself, e.g. in the presence of $BF_3$, or by addition of these epoxides, optionally as mixtures or successively, to starting components which contain reactive hydrogen atoms such as alcohols or amines, e.g. water, ethylene glycol, propylene-1,3-or-1,2-glycol, trimethylol propane, 4,4'-dihydroxydiphenylpropane, aniline, ammonia, ethanolamine or ethylenediamine. Sucrose polyethers such as those described, e.g. in German Pat. Nos. 1,176,358 and 1,064,938 may also be used according to this invention. It is frequently preferred to use polyethers which contain predominantly primary OH groups, (up to 90% by weight, based on the total OH group content of the polyether). Polyethers modified with vinyl polymers such as those which may be obtained by polymerizing styrene or acrylonitrite in the presence of polyethers, (U.S. Pat. Nos. 3,383,351; 3,304,273; 3,525,093 and 3,110,695 and German Pat. No. 1,152,536), and polybutadienes which contain contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers, polythioether esters or polythioether ester amides, depending on the cocomponent.

The polyacetals used may be for example, the compounds which may be obtained from glycols, e.g. diethylene glycol, triethylene glycol, 4,4'-dihydroxydiphenyldimethylmethane, hexanediol and formaldehyde. Polyacetals suitable for the invention may also be prepared by the polymerization of cyclic acetals.

The polycarbonates with hydroxyl groups used may be of the known kind, e.g. those which may be prepared by reacting diols, e.g. propane-1,3-diol, butane-1,4 diol and/or hexane-1,6-diol or diethylene glycol, triethylene glycol or tetraethylene glycol, with diarylcarbonates, e.g. diphenylcarbonate or phosgene.

The polyester amides and polyamides include, e.g. the predominantly linear condensates obtained from polyvalent saturated and unsaturated carboxylic acids or their anhydrides and polyvalent saturated and unsaturated amino alcohols, diamines, polyamines and mixtures thereof.

Examples of these compounds which are to be used according to the invention have been described e.g. in High Polymers, Vol. XVI, "Polyurethanes, Chemistry and Technology", published by Saunders-Frisch, Interscience Publishers, New York, London, Volume I, 1962, pages 32 to 42 and pages 44 to 54 and Volume II 1964, pages 5 to 6 and 198 to 199 and in Kunststoof-Handbuch, Volume VII, Vieweg-Hochtlen, Carl-Hanser-Verlag, Munich, 1966, e.g. on pages 45 to 71.

Suitable modified organic polyisocyanates, as well as their propolymers, especially those based on aromatic polyisocyanates, can also be subsequently modified to give ionic groups, for example by reaction with sulphones, beta-lactones, by grafting on acrylic acid, methacrylic acid or crotonic acid, for example, or by sulphuric acid, chlorosulphonic acid, oleum or sulphur trioxide and used in the invention. In particular, organic polyisocyanates such as tolylene diisocyanate, diphenylmethane diisocyanate, hexamethylene diisocyanate, and the known phosgenation products of the condensation products of aromatic monoamines, especially aniline and aldehyde, especially formaldehyde, reacted with sulphuric acid, oleum or sulphur trioxide may be used in this invention. Sulphonated polyisocyanates of this kind which generally still contain urethane, urea, and biuret groups, and in particular where polyol modification has been carried out before sulphonation, urethane-and/or allophanate groups which are formed through secondary reactions during sulphonation are therefore particularly preferred as polyisocyanates containing ionic groups. The NCO terminated prepolymers used, for example for the production of aqueous polyurethane dispersions (U.S. Pat. No. 3,756,992) can be used for the process according to the invention.

Component C

Component (C) contains organic amphiphilous compounds, preferably contain from 1 to 9 carbon atoms and has a molecular weight of from 32 to about 400, preferably from 32 to 150, which contain one OH group and/or at least one other hydrophilic and/or polar group. The other hydrophilic and/or polar group is preferably a functional group corresponding to one of the following general formulae: $RSH$, $RCH_2Cl$, $RCH_2Br$, $RCH_2I$, $RCN$, $RNO_2$, $RCOCl$, $RCOBr$, $RSO_2Cl$, $RCOOH$, $RSO_3H$, $RCOO^-$, $RSO_3^-$, $ROR$,

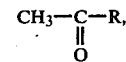

wherein R denotes a methyl, ethyl or propyl group. The organic amphilphilous compounds of component C may contain an OH group and/or from 1 to 6, preferably 1 or 2 of these other functional groups.

The following are examples of component (C):
1. Alcohols, thioalcohols, phenols and thiophenols:
    methanol, ethanol, propanol, isopropanol, butanol, isobutanol, t-butyl alcohol and the isomeric pentanols, hexanols and heptanols, cyclohexanol, methylcyclohexanol, allyl alcohol methallyl alcohol, cyclohexano-methanol, benzyl alcohol, butylmercaptan, phenols, e.g. phenol and the cresols, thiophenols and thiocresols. Alcohols with from 1 to 4 carbon atoms are preferred, particularly methanol.
2. Aldehydes:
    Formaldehyde, acetaldehyde, propionaldehyde, butyl aldehyde, pentanals, hexanals, heptanals, octanals and their simple substitution products, semi-acetals and full acetals.
3. Carboxylic acids:
    Formic acid, acetic acid, propionic acid, butyric acid, isobutyric acid, pentanoic acid, hexane carboxylic acid, heptane carboxylic acid, cyclohexane carboxylic acid, benzoic acid, toluic acid.
4. Carboxylic acid chlorides, carboxylic acid bromides, sulphonic acid chlorides:
    Acetyl chloride, propionic acid chloride, acetyl bromide, acid chlorides of $C_4$–$C_6$ monocarboxylic acids, but also methanesulphonic acid chloride, benzenesulphonic acid chloride, p-toluenesulphochloride, o-toluenesulphochloride, carbamic acid chlorides, e.g. t-butyl carbamic chloride, and phenylcarbamic chloride.
5. Esters:
    Methyl acetate, ethyl acetate, propylacitate, butyl acetate, amyl acetate, the methyl and ethyl esters of propionic, butyric, pentanoic, hexanoic and heptanoic acid and the corresponding isomeric compounds, for example isobutyric acid, and 2,4,6-tribromophenylacetate.
6. Ethers and Thioethers:
    Methyl ethyl ether, cyclohexyl methyl ether, methyl butyl ether, phenol methyl ether, thiophenol methyl ether, cresol methyl ether, tetrahydrofuranomethyl-methyl ether.
7. Halomethyl compounds:
    Ethyl chloride, ethyl bromide, ethyl iodide, n-propylchloride, n-propylbromide, n-propyliodide, isopropyl chloride, isopropyl bromide, isopropyl iodide, butyl chloride, butyl bromide, butyl iodide, $C_3$–$C_6$-halogenated methyl compounds, benzylhalides e.g. benzylchloride or benzylbromide, hexahydrobenzyl halides, e.g. cyclohexanomethyl chloride, epichlorohydrin, 2-ethyl-2-chloromethyloxetane and 2-ethyl-2-chloro-methyloxetane. Halogenated methyl compounds which contain from 4 to 7 carbon atoms are preferred.

8. Ketones:

Methyl ethyl ketone, methyl-isopropyl ketone, methyl-isobutyl ketone, methyl-isoamyl ketone, methyl-n-propyl ketone, methyl-n-butyl ketone, methyl-t-butyl ketone, methyl-furanyl ketone, methyl-tetrahydrofuranyl ketone, methyl-heptyl ketone, ethylhexyl ketone, acetaphonone, $\omega$-chloroacetophenone and propiophenone.

9. Nitriles:

Acetonitrile, propionitrile, butyronitrile, tolunitrile, hexahydrobenzonitrile, acrylonitrile, allylnitrile, methallylnitrile, methacrylonitrile.

10. Nitro compounds:

Nitromethane, nitroethane, nitrohexane, nitrobenzene, chlorinated nitrobenzenes, nitro-cyclohexanes, brominated nitrobenzenes, benzyl nitrate and nitrotoluene.

11. Sulphonic acids:

Methanesulphonic acid, ethanesulphonic acid, butanesulphonic acid, benzenesulphonic acid, 2-toluenesulphonic acid, 4-toluenesulphonic acid, chlorosulphonic acid esters and sulphonic acid esters e.g. methanesulphonic acid methyl ester, methane sulphonic acid ethyl ester and chlorosulphonic acid methyl ester.

The carboxyl acids and/or sulphonic acids may be partially or completely neutralized, for example with alkali metal and alkaline earth metal hydroxides e.g. sodium hydroxide, potassium hydroxide, barium hydroxide, or magnesium hydroxide, or by the addition of amines, e.g. trimethylamine, triethylamine, methylmorpholine, pyridine, dimethylaniline, or metal alcoholates e.g. sodium t-butanolate or potassium isopropanolate. Metal oxides, hydroxides or carbonates, either in the solid form or suspended in diluents, may also be used for neutralization. Calcium oxide, magnesium oxide, calcium carbonate, magnesium carbonate and dolomite, for example, are particularly suitable. Tertiary amines are useful in this neutralization, e.g. alkoxylated products of primary and secondary amines, and also polyesters or polyacrylates which contain tertiary nitrogen atoms as well as the known condensation products based on epichlorohydrin and polyamines.

12. Components (C) according to this invention may also comprise compounds which contain phosphorus, for example, trimethyl phosphite, trimethylphosphates, triethylphosphite, triethyl phosphate, diethylphosphite, diethylphosphate, dimethylphosphite, dimethylphosphate, thiophosphoric acid-O, O-dimethylester, thiophosphoric acid trimethylester, or theophosphoric acid-O, O-dimethyl ester chloride.

13. Lignin:

Calcium lignosulfonate, lignosulfonic acid sodium salts, lignosulfonic acid, lignin sulfate produced by the alkali process (Kraft's process) and particularly de-sulfonated lignin.

Component D

Component (D) contains the curing agents and/or activators. The following are examples of Component D:

1. Water.
2. Water containing 10% to 70% by weight of an alkali metal silicate, such as sodium and/or potassium silicate. Crude commercial alkali metal silicate may contain other substances, e.g. calcium silicate, magnesium silicate, borates or aluminates and may also be used. The molar ratio of $Ml_2OSiO_2$ (Ml=metal) is not critical and may vary within the usual limits but is preferably between 4 to 1 and 0.2 to 1.
3. Water containing 20 to 50% by weight of ammonium silicate.
4. Water containing 5% to 40% by weight of magnesium oxide in the form of a colloidal dispersion.
5. Alkali metal metasilicate pentahydrate such as sodium, commercial dry granular sodium and potassium silicates, and potassium metasilicate pentahydrate.
6. Water containing 20% to 70% by weight of silica sol.
7. Water containing 0.001% to 10% by weight of an activator (catalyst) such as
   (a) tertiary amines, e.g. triethylamine, tributylamine, N-methyl-morpholine, N-ethyl-morpholine, N-coco-morpholine, N,N,N',N'-tetramethylethylenediamine, 1,4-diazo-bicyclo-(2,2,2)-octane, N-methyl-N'-dimethylaminoethyl piperazine,N,N-dimethylbenzylamine, bis(N,N-diethylaminoethyl)-adipate, N,N-diethylbenzylamine, pentamethylenetriamine, N,N-dimethylcyclohexylamine, N,N-dimethylcyclohexylamine, N,N,N',N'-tetramethyl-1,3-butanediamine, N,N-dimethylbeta-phenylethylamine and, 1,2-dimethylimidazole. Suitable tertiary amine activators which contain hydrogen atoms which are reactive with isocyanate groups include, e.g. triethanolamine, triisopanolamine, N,N-dimethylethanolamine, N-methyl-diethanolamine, N-ethyldiethanolamine, and their reaction products with alkylene oxides, e.g. propylene oxide and/or ethylene oxide.
   (b) Organo-metallic compounds, preferably organo-tin compounds such as tin salts of carboxylic acids, e.g. tin acetate, tin octoate, tin ethyl hexoate, and tin laurate and the dialkyl tin salts of carboxylic acids, e.g. dibutyl tin diacetate, dibutyl tin dilaurate, dibutyl tin maleate or diocyl tin diacetate.
   (c) Silaamines with carbon-silicon bonds as described e.g. in British Pat. No. 1,090,589, may also be used as activators, e.g. 2,2,4-trimethyl-2-silamorpholine or 1,3-diethylaminomethyl-tetramethyl-disiloxane.
   (d) Other examples of catalysts which may be used according to the invention and details of their action are described in Kunststoff-Handbuch, Volume VII, published by Vieweg and Hochtlen, Carl-Hanser-Verlag, Munich, 1966, e.g. on pages 96 and 102.
8. Water containing 20% to 70% by weight of a water-binding agent being capable of absorbing water to form a solid or a gel, such as hydraulic cement, synthetic anhydrite, gypsum or burnt lime.

9. Water containing 1% to 10% by weight of bases which contain nitrogen such as tetraalkyl ammonium hydroxides.
10. Water containing 1% to 10% by weight of alkali metal hydroxides such as sodium hydroxide, alkali metal phenolates such as sodium phenolate or alkali metal alcoholates such as sodium methylate.
11. Water containing sodium polysulfide in the amount of 1% to 10% by weight.

Surface active additives, (emulsifiers and foam stabilizers) may also be used according to the invention. Suitable emulsifiers are e.g. the sodium salts of ricinoleic sulphonates or of fatty acids, or salts of fatty acids with amines, e.g. oleic acid diethylamine or stearic acid diethanolamine. Other surface active additives are alkali metal or ammonium salts of sulphonic acids, e.g. dodecylbenzene sulphonic acid or dinaphthyl methane disulphonic acid, or of fatty acids e.g. ricinoleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described e.g. in U.S. Pat. No.3,629,308. These additives are preferably used in quantities of from 0% to 20%, by weight, based on the reaction mixture.

Negative catalysts, for example, substances which are acidic in reaction, e.g. hydrochloric acid or organic acid halides, known cell regulators, e.g. paraffins, fatty alcohols or dimethyl polysiloxanes, pigments or dyes, known flame retarding agents, e.g. tris-chlorethylphosphate or ammonium phosphate and polyphosphates, stabilizers against aging and weathering, plasticizers, fungicidal and bacteriocidal substances and fillers, e.g. barium sulphate, kieselguhr, carbon black or whiting, may also be used according to the invention.

Further examples of surface active additives, foam stabilizers, cell regulators, negative catalysts, stabilizers, flame retarding substances, plasticizors, dyes, fillers and fungicidal and bacteriocidal substances and details about methods of using these additives and their action may be found in Kunststoff-Handbuch, Volume VI; published by Vieweg and Hochtlen, Carl-Hansen-Verlag, Munich 1966, e.g. on pages 103 to 113. The halogenated paraffins and inorganic salts of phosphoric acid are the preferred fire retardant agents.

SUMMARY OF THE INVENTION

I have discovered that an oxidated silicon compound will react chemically with a polyisocyanate compound to produce a polyisocyanate silicate prepolymer and that the prepolymer will react with organic compounds to produce a polyisocyanate organic silicate solid/cellular solid product.

The preferred method is to react a polyisocyanate and/or isocyanate-terminated polyurethane prepolymer of component (B) with an oxidated silicon compound of component (A) to produce a polyisocyanate silicate prepolymer and/or polyurethane silicate prepolymer which is then reacted with an organic compound (or mixture thereof) of component (C) and a curing agent and/or activator of component (D) to produce a polyisocyanate organic silicate solid/cellular solid product.

The proportion, by weight, of component (D) to component (B) is preferably from 1:70 to 80:20, and the quantity of component (C) is from 1 to 30 percent by weight, preferably from 2 to 20 percent, by weight, based on component (B). The proportion by mols of component (A), oxidated silicon compounds, to component (B), polyisocyanate is from 2:1 to 1:2. An excess of the oxidated silicon compound may be used, and the unreacted proportion acts as a filler.

In an alternate method, all four components, (A), (B), (C) and (D), are added simultaneously and mixed homogeneously, and in a short period of time (a few seconds to about 10 minutes) the chemical reaction begins, and a solid/cellular solid product is produced within a few minutes.

Components (C) and (D) in most cases, can be pre-mixed when the preferred method is used. When the alternate method is used, components (A), (C) and (D), in most cases can be pre-mixed.

In the preferred method, the fine granular oxidated silicon compound and the polyisocyanate or polyisothiocyanate compound are mixed then agitated at a temperature between 20° C. to 60° C. for 10 to 30 minutes or until a smooth, creamy appearance is obtained thereby producing a polyisocyanate silicate prepolymer. The chemical reaction is enhanced by the presence of an alkali catalyst in the amount of 1% to 10% by weight, based on the oxidated silicon compound. Any suitable alkali catalyst may be used such as sodium carbonate, potassium carbonate, sodium hydroxide, calcium carbonate, sodium silicate, potassium silicate, alkali metal salts of weak acids and mixtures thereof.

The polyisocyanate silicate prepolymer may be further reacted with a polyol to produce an isocyanate-terminated polyurethane silicate prepolymer by mixing a polyisocyanate silicate prepolymer which contains free NCO groups with an amount of polyol which contains less OH groups than NCO groups present. The isocyanate-terminated polyurethane silicate prepolymer will react chemically with components (C) and (D) to produce polyisocyanate organic silicate solid/cellular solid products. The reaction takes place at ambient temperature and pressure. When an excess of oxidated silicon is used it will react chemically with the polyol in the presence of an alkali catalyst and by heating to just below the boiling temperature of the reactants while agitating for 20 to 60 minutes thereby producing a polyol silicate product which will react chemically with the polyisocyanate.

In selected cases, components (A), (B) and (C) may be chemically reacted together to form a prepolymer; then component (D) is added to cure the prepolymer thereby producing a polyisocyanate organic silicate solid/cellular solid product.

In selected cases, components (A) and (B) are reacted with an excess amount of component (C) to produce a liquid prepolymer which contains no free NCO groups. This prepolymer may then be reacted with components (B) and (D) to produce a polyisocyanate organic silicate solid/cellular solid product.

In selected cases, components (A), (B) and (C) will react chemically at ambient temperature and pressure to produce a polyisocyanate organic silicate solid/cellular solid product. This especially occurs when component (C) is an alcohol, carboxylic acid or, an alkali metal salt of a carboxylic acid.

Mixtures which contain more than 30% by weight of water are usually soft solid products which may be used as putties, surface coatings, adhesive bonds, grouting compositions and may be used for producing foams by adding a blowing agent. They are usually inert liquids with boiling points ranging from −25° to 80° C.

The organic blowing agents used may be, e.g. acetone, ethyl acetate, methanol, ethanol, halogenated alkanes, e.g. methylene chloride, chloroform, ethylidene chloride, vinylidene chloride, monoflurotrichloromethane, chlorodifluoromethane, dichlorodifluoromethane, butane, hexane, heptane or diethylether. Compounds which decompose at temperatures above room temperature with liberation of gases, e.g. nitrogen, such as azo compounds, azoisobutyric acid nitrile, may also act as blowing agents. Other examples of blowing agents and details about the use of blowing agents are described in Kunststoff-handbuch, Volume VII, published by Vieweg and Hochtlen, Carl-Hanser-Verlag, Munich 1966, e.g. on pages 108 and 109, 453 to 455 and 507 to 510.

The proportions of the components may be adjusted to obtain the desired product from a solid to a highly cellular solid. When water is used it reacts with the NCO group to produce $CO_2$ and pores are produced in the product by the evolved $CO_2$. In certain cases the $CO_2$ is rapidly evolved and escapes before the product hardens and a solid product can be produced nearly completely free of air cells. The hardening times generally increase with decreasing proportions of component (C). When a high silicate content, from 80% to 99% by weight, is desirable such as when the final product is required to have mainly the properties of an inorganic silicate plastic, in particular high temperature resistance and complete flame resistance, an alkali metal silicate may be added with component (A) or (D) or reacted with part of component (B) to produce an alkali metal polyisocyanate silicate prepolymer. In that case, the function of the polyisocyanate is that of a non-volatile hardener whose reaction product is a high molecular weight polymer which reduces the brittleness of the product.

When an alkali catalyst or alkali metal silicate is used in the invention, fine metal powders, e.g. powdered calcium, magnesium, aluminum or zinc, may also act as blowing agents by bringing about the evolution of hydrogen. Compressed air may be mixed in the components and may also be used to mix the components, then used as the blowing agent. These metal powders also have a hardening and reinforcing effect.

The properties of the foams (cellular solid) obtained from any given formulation, e.g. their density in the moist state, depends to some extent on the details of the mixing process, e.g. the form and speed of the stirrer and the form of the mixing chamber, and also the selected temperature at which foaming is started. The foams will usually expand 3 to 12 times their original volume.

The products produced by the invention have many uses. The reaction mixture with or without a blowing agent, may be mixed in a mixing apparatus; then the reaction mixture may be sprayed by means of compressed air or by the airless spraying process onto surfaces, subsequently, the mixture expands and hardens in the form of a cellular solid which is useful for insulation, filling, and moisture-proofing coating. The foaming material may also be forced, poured or injected molded into cold or heated molds, which may be relief molds or solid or hollow molds, optionally by centrifugal casting and left to harden at room temperature or temperatures up to 200° C., optionally under pressure. In certain cases it may be necessary to heat the mixing or spraying apparatus to initiate foaming; then once foaming has started, the heat evolved by the reaction between components continues the foaming until the reaction is complete. A temperature between 40° to 150° C. may be required to initiate foaming. Reinforcing elements may quite easily be incorporated into the reaction mixtures. The inorganic and/or organic reinforcing elements may be, e.g. fibers, metal wires, foams, fabrics, fleeces or skeletons. The reinforcing element may be mixed with the reaction mixtures for example, by the fibrous web impregnation or by processes in which the reaction mixtures and reinforcing fibers are together applied to the mold, for example, by means of a spray apparatus. The shaped products obtainable in this way may be used as building elements, e.g. in the form of sandwich elements, e.g. in the form of sandwich elements either as such or after they have been laminated with metal, glass or plastics; if desired, these sandwich elements may be foamed. The products may be used as hollow bodies, e.g. as containers for goods which may be required to be kept moist or cool, as filter materials or exchanges, as catalyst carriers or carriers of other active substances, as decorative elements, furniture components and fillings for cavities. They may be used in the field of model building and mold building, and the production of molds for metal casting may also be considered.

According to the preferred method of carrying out the process, the blowing agent may be added to component (C) and emulsifier added to component (D). Instead of blowing agents, finely divided inorganic or organic hollow particles, e.g. hollow expanded beads of glass, plastics and straw, may be used for producing cellular solids products. These products may be used as insulating materials, cavity fillings, packaging materials, building materials which have good solvent resistance and advantageous fire characteristics. They may also be used as lightweight building bricks in the form of sandwiches, e.g. with metal covering layers for house building and the construction of motor vehicles and aircraft.

Organic or inorganic particles which are capable of foaming up or have already been foamed may be incorporated in the fluid foaming reaction mixture e.g. expanded clay, expanded glass, wood, cork, popcorn, hollow plastic beads e.g. beads of vinyl chloride polymers, polyethylene, styrene polymers, or foam particles of these polymers or of other polymers, e.g.—polysulphone, polyepoxide, polyurethane, urea-formaldehyde, phenolformaldehyde or polyimide polymers, or, alternatively, heaps of these particles may be permeated with foaming reaction mixtures to produce insulating materials which have good fire resistant characteristics.

The cellular solid products of the invention, in the aqueous or dry or impregnated state, may subsequently be lacquered, metallized, coated, laminated, galvanized, vapor treated, bonded or blocked. The cellular solid products may be sawed, drilled, planed, polished or other working processes to produce shaped products. The shaped products with or without filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness and yet they are still elastic. They are resistant to tension and compression and have a high dimensional stability to heat and high flame resistance. They have excellent sound absorption capacity, heat insulating capacity, fire resistance, and heat resistance which makes them useful for insulation. The cellular products of this invention may be foamed on the building site and in many cases used in place of wood or hard fiber boards. Any hollow forms may be used for foaming. The brittle foams may be crushed and used as a filler, as a soil conditioner, as a substrate for the propagation of seedlings, cuttings and plants or cut flowers.

A water binding component such as hydraulic cement, synthetic anhydrides, gypsum or burnt lime may be added to any of the components or mixed simultaneously with the mixing of components (A), (B), (C) and (D) to produce a tough, somewhat flexible solid/cellular solid concrete. This mixture may be used as surface coatings having good adhesion and resistance to abrasion properties, as mortars, for making molded products, particularly in construction engineering and civil engineering as for building walls, roadbuilding, igloos, boats, etc. These products are light weight thermal insulating materials with excellent mechanical properties and fire-resistance. It is preferable that the polyisocyanate of component (B) is an isocyanate-terminated polyurethane prepolymer or that a polyol is added in component (A), (C) or (D) in the ratio of 1 to 50 mols of the polyol to 50 to 99 mols of the polyisocyanate. Good concrete products can be obtained without using polyurethane prepolymers or polyols. The amount of water binding component used varies greatly depending on the type of product desired, from 0% to 100% by weight, based on weight of components (A), (B), and (C). In certain cases it is desirable to add sand and gravel in the amount of 1 to 6 parts by weight to each part by weight of the hydraulic cement used in the invention. The mixture may be poured in place, trowelled on or sprayed onto the desired surface to produce a solid/cellular solid product.

Fillers in the form of powders, granules, wire, fibers, dumb-bell shaped particles, crystallites, spirals, rods, beads, hollow beads, foam particles, non-woven webs, pieces of woven or knitted fabrics, tapes and pieces of foil of solid inorganic or organic substances, e.g. dolomite, chalk, alumina, asbestos, basic silicic acids, sand, talc, iron, oxide, aluminum oxide and hydroxides, alkali metal silicates, zeolites, mixed silicates, calcium silicates, calcium sulphates, alumino silicates, cements, basalt wool or powder, glass fibers, carbon fibers, graphite, carbon black, Al, Fe, Cu and Ag powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled foamed or unfoamed stretched or unstretched organic polymers, may be added to the mixture of the components (A), (B), (C), and (D) in many applications. Among the numerous organic polymers which may be used, e.g. as powders, granules, foam particles, beads, hollow beads, foamable but not yet foamed particles, fibers, tapes, woven fabrics, or fleeces, the following may be mentioned as examples, polystyrene, polyethylene, polypropylene, polyacrylonitrile, polybutadiene, polyisoprene, polytetrafluorethylene, aliphatic and aromatic polyesters, melamine, urea, phenol resins, silicate resins, polyacetal resins, polyepoxides, polyhydantoins, polyureas, polyethers, polyurethanes, polyimides, polyamides, polysulphones, polycarbonates and copolymers thereof.

The composite materials according to the invention may be mixed with considerable quantities of fillers without losing their advantageous properties, and in particular composite materials which consist predominantly of inorganic constituents which are preferably filled with inorganic fillers; where silicate constituents predominate, it is preferably filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g. less than 5%, or prepolymers which are free from isocyanate groups. The mixtures obtained in this way have a long pot life and may be applied in thin layers which gradually harden in the course of time. The liberated $CO_2$ and the $CO_2$ acts as the curing agent. A two stage or multistage hardening in which, for example, when an excess of water is used there is a rapid evolution of $CO_2$ and the polyisocyanate organic silicate-solid product is converted into a plastic or thermoplastic, workable form which may be used as putties, coating agents, grouting materials or mortar. This thermoplastic form may also be injection molded, extruded or worked-up in a kneader.

In many cases, the polyisocyanate organic silicate solid/cellular solid products produced by the invention are soluble in organic solvents and may be used as a tough coating agent for wood and metal. The mixtures of the invention are also suitable for use as impregnating agents for finishing fibers. The mixtures may also be extruded through dies or slots and converted into fibers and foils. These fibers and foils may be used for producing synthetic incombustible paper or fleeces.

The object of the present invention is to provide a novel method of producing polyisocyanate organic silicate solid/cellular solid products. Another object is to produce novel polyisocyanate organic silicate solid/cellular solid products which are relatively low in cost. Still another object is to produce novel fine cellular solid products of relatively low cost, rigid, light weight, high-strength, and has good flame resistance and dimensional stability when heated. Another object is to produce solid/cellular solid products that may be used for thermal insulating, structural purposes, sound proofing, shock-resistant packaging, cushions, coating wood and metals, adhesives, casting material, putty, etc.

DESCRIPTION OF PREFERRED EMBODIMENTS

My invention will be illustrated in greater detail by the specific examples which follow, it being understood that these preferred embodiments are illustrative of, but not limited to, procedures which may be used in the production of polyisocyanate organic silicate solid/cellular solid products. Parts and percentages are by weight unless otherwise indicated.

EXAMPLE 1

About 2 parts by weight of fine granular hydrated silica, 0.2 parts by weight of sodium carbonate and 4 parts by weight of toluene diisocyanate (80% 2,4- and 20% 2,6-) are mixed then agitated for 10 to 30 minutes at ambient pressure and at a temperature of 20° to 35° C. or until a creamy mixture is obtained thereby producing a toluene diisocyanate silicate prepolymer.

The following Examples, 2 through 33, will utilize 3 parts by weight of the toluene diisocyanate silicate prepolymer (Components A and B) as produced in Example 1, 0.5 part by weight of Component (C) and 0.5 part by weight of Component (D). The components are mixed at ambient temperature, and in a few minutes the reaction is complete.

| Ex. | Component C | Component D | Type of Product |
|---|---|---|---|
| 2 | none | water | rigid cellular solid |
| 3 | methanol | none | rigid cellular solid |
| 4 | ethanol | none | rapid foaming then a solid |
| 5 | isopropanol | water | rigid cellular solid |
| 6 | butanol | water | rigid cellular solid |
| 7 | allyl alcohol | water | rigid cellular solid |
| 8 | methallyl alcohol | water | rigid cellular solid |
| 9 | phenol | water | rigid cellular solid |
| 10 | cresol | water | rigid cellular solid |
| 11 | furfuryl alcohol | water | rigid cellular solid |
| 12 | thiophenol | water containing 25% sodium silicate | rigid cellular solid |
| 13 | formaldehyde | 37% aqueous solution | rigid cellular solid |
| 14 | acetaldehyde | water | rigid cellular solid |
| 15 | furfural | water containing 20% magnesium oxide | rigid cellular solid |
| 16 | acetone | water containing 1% sodium dioctyl sulfosuccinate | rigid cellular solid |
| 17 | methyl ethyl ketone | water | solid |
| 18 | acetic acid | none | rigid cellular solid |
| 19 | acetic acid | water | rigid cellular solid |
| 20 | propionic acid | water | rigid cellular solid |
| 21 | benzoic acid | water | rigid cellular solid |
| 22 | epichlorohydrin | water containing 1% of diethylenetriamine | rigid cellular solid |
| 23 | ethylene chlorohydrin | water containing 10% sodium silicate | rigid cellular solid |
| 24 | acetonitrile | water containing .01% tin octoate | rigid cellular solid |
| 25 | ethylene chloride | water containing 20% potassium silicate | rigid cellular solid |
| 26 | allyl chloride | water | rigid cellular solid |
| 27 | acrolein | water | rigid cellular solid |
| 28 | methallyl chloride | water containing 15% sodium silicate | rigid cellular solid |
| 29 | acrylonitrile | water containing 10% sodium silicate and 5% magnesium oxide | rigid cellular solid |
| 30 | methyl chloride | water containing 5% sodium hydroxide flakes | rigid cellular solid |
| 31 | malic acid | water | rigid cellular solid |
| 32 | sodium acetate | water | rigid cellular solid |
| 33 | calcium propionate | water | rigid cellular solid |

EXAMPLE 34

About 2 parts by weight of dry granular silicic acid gel and 3 parts by weight of toluene diisocyanate (80% 2,4-isomer and 20% 2,6-isomer) are mixed then agitated at about 30° C. for 10 to 30 minutes until a creamy mixture is obtained, thereby producing a polyisocyanate silicate prepolymer.

In the following Examples, 35 through 50, they will utilize 4 parts by weight of the polyisocyanate silicate prepolymer (components A and B) as produced in Example 34, which are mixed with 1 part by weight of component (C) and a varying amount of component (D) while vigorously agitating until the mixture begins to thicken or foams. The reaction is complete in a few minutes thereby producing polyisocyanate organic silicate solid/cellular products.

| Ex. | Component C | Parts by weight Component D | Type of Product |
|---|---|---|---|
| 35 | methanol | 2 water | rapidly foams then solid |
| 36 | cyclohexanol | 0.5 water with 3% soap | rigid cellular solid |
| 37 | sodium acetate | 0.2 water | rigid cellular solid |
| 38 | cyclohexanomethol | 0.1 water | rigid cellular solid |
| 39 | acrolein | 0.25 water | rigid cellular solid |
| 40 | methylene chloride | 0.5 water with 10% sodium carbonate | rigid cellular solid |
| 41 | ethylene chloride | 1 water containing 100% by weight of Portland cement | rigid cellular solid |
| 42 | methyl chloride | 0.5 water containing 5% calcium hydroxide | rigid cellular solid |
| 43 | ethyl bromide | 0.5 water containing 10% potassium carbonate | rigid cellular solid |
| 44 | p-toluenesulphonic acid | 0.5 water containing 40% sodium silicate and 0.1% triethylamine | rigid cellular solid |
| 45 | 2-chloro-2-methylpropane with 1 part by weight of trichlorofluoromethane | 0.5 water containing 10% sodium silicate, 4% silica and 5% magnesium oxide | rigid cellular solid |
| 46 | 1-Bromobutane | 0.5 water containing 10% glycerol | rigid cellular solid |
| 47 | benzoic acid | 0.5 water | rigid cellular solid |
| 48 | methacrylonitrile | 0.5 water containing 50% triethylene glycol | rigid cellular solid |
| 49 | triethyl phosphate | 1 water | solid |
| 50 | sodium butionate | 2 water containing 30% cement, 20% castor oil and 0.1% triethylamine | tough solid |

EXAMPLE 51

About 1 part by weight of hydrated silica containing Si-H bonds (silicoformic acid), 1 part by weight of cement and 3 parts by weight of diisocyanatodiphenylmethane which has been distilled from the crude phosgenation product of an anilineformaldehyde condensation until the distillation residue has a viscosity between 100 cP to 200 cP at 25° C. are mixed then agitated from 10 to 30 minutes at about 30° to 40° C. thereby producing a polyisocyanate silicate prepolymer.

The following Examples 52 through 56 utilize 3 parts by weight of the polyisocyanate silicate prepolymer components A and B as produced in Example 51 and are mixed with components (C) and (D) then vigorously agitated for 1 to 10 minutes or until the mixture begins to foam or increases in viscosity thereby producing a polyisocyanate organic silicate solid/cellular solid product.

| Ex. | Parts by Weight of Component C | Parts by Weight of Component D | Type of Product |
|---|---|---|---|
| 52 | 0.1 methanol | 4 water containing 20% cement, 10% polyethylene glycol (av. 500 mol. wt.) | tough rigid solid |
| 53 | 0.2 epichlorohydrin | 0.5 water containing 10% diethylenetriamine | rigid cellular foam |
| 54 | 0.4 phenol | 3 water contain- | rigid cellular solid |

-continued

| Ex. | Parts by Weight of Component C | Parts by Weight of Component D | Type of Product |
|---|---|---|---|
| 55 | 0.4 furfuryl alcohol 0.2 | 3 water containing 20% quick-ing 20% mortar cement | rigid cellular solid |
| 56 | 0.25 furfural 0.1 calcium lignosulfonate | lignosulfonic acid sodium salt setting cement, 5% sodium silicate and 5% castor oil. 2 water containing 50% sand and rock, 5% calcium silicate, 10% polypropylene (av. mol wt. 500) | rigid cellular solid |

In the following Examples 57 through 62, Components (A), (B), (C) and (D) are mixed simultaneously, then agitated vigorously for 1 to 10 minutes or until the mixture begins to expand or the viscosity increases, at a temperature between 20° to 60° C., thereby producing a polyisocyanate organic silicate solid/cellular solid. The reaction is complete in 1 to 30 minutes. Component (A) consists of 2 parts by weight of fine granular hydrated silica.

| Examples | Parts by Weight of Component B | Parts by Weight of Component C | Weight of Component D |
|---|---|---|---|
| 57 | 4 parts toluene diisocyanate (HYLENE T.M.) | 0.25 methanol | 0.5 water |

| Examples | Parts by Weight of Component B | Parts by Weight of Component C | Parts by Weight of Component D |
|---|---|---|---|
| 58 | 3 parts sulphonated diisocyanatodiphenylmethane which has been distilled from the crude phosgenation product of an aniline, formaldehyde residue until the distillation residue has a viscosity of 400 to 700 cP at 25° C., NCO-content 29 to 31% by weight. | 0.25 methanol 1 trichlorofluromethane | 0.25 water containing 10% sodium silicate, .02% triethylamine, and .01% sodium salt of a sulphochlorinated $C_{10}$–$C_{14}$ paraffin mixture |
| 59 | 3 parts ("Crude (MDI") | 0.25 ethanol | 0.2 parts water |
| 60 | sulphonated polyphenol-polymethylene-polyisocyanate NCO content 30% | 0.25 ethylene chloride, 0.25 trichlorofluoromethane 0.25 part chlorinated paraffin mixture | 2 parts cement 0.5 part sodium silicate, 0.5 part fine granular sand, 0.01 part N,N,N,-w-(dimethylamine-n-propyl) hexa hydrotriazine and 2 parts water |
| 61 | 3 parts of 20% solution of tolyene diisocyanate residue in ("crude MDI") with NCO content of 30% 0.5 parts of the sulphonated polyphenyl-polymethlenepolyisocyanate, NCO content 30.2% | 0.25 parts furfural | 0.5 part water, 0.5 part polyethylene oxide monoalcohol started on n-butanol, 0.01 part triethylamine 0.01 part detergent |
| 62 | 3 parts P,P-diphenyl-methane diisocyanate, NCO content 29% | 0.25 parts ethylene chlorohydrin | 0.5 part water containing 15% sodium silicate |

The following Examples 63 through 72 utilize a polyol silicate compound and/or polymer as component (A) which is produced by mixing 1 to 2 mols of a fine granular oxidated silicon compound with 1 to 2 mols of a polyol and adding an alkali catalyst, sodium carbonate in the amount of 1% to 10%, based on the weight of oxidated silicon compound, then heating the mixture at a temperature just below the boiling temperature of the polyol while agitating for 20 to 60 minutes thereby producing a polyol silicate compound.

Components (A), (B), (C) and (D) are mixed simultaneously at a temperature between 20° to 60° C. then agitated vigorously until the mixture begins to expand or the viscosity is increased (1 to 10 minutes), thereby producing a polyisocyanate organic silicate solid/cellular solid product. Component (B) is 2 parts by weight of toluene diisocyanate (80% 2,4-isomer, 20% 2,6-isomer) in the following Examples. The product produced is a cellular solid product.

| Examples | Parts by Weight of Component A | Parts by Weight of Component C | Parts by Weight of Component D |
|---|---|---|---|
| 63 | 2 parts glycerol silicate | 0.25 methanol | 0.5 water containing 10% sodium silicate |
| 64 | 2 parts ethylene glycol silicate | 0.1 methyl chloride | 0.25 water containing 0.01% tin octoate |
| 65 | 1 part diethylene glycol silicate | 0.2 ethanol 0.1 acetone | 0.1 water containing 0.01% triethanolamine |
| 66 | 1 part castor oil silicate | 0.1 thiocresol 0.1 lignin sulfate | 0.1 water containing 10% magnesium oxide |
| 67 | 3 parts polyethylene glycol silicate (av. mol. wt. 520) | 0.2 sodium acetate | 2 water containing 50% cement and 10% lignosulfonic acid |

| Examples | Parts of Weight of Component A | Parts of Weight of Component B | Parts of Weight of Component D |
|---|---|---|---|
| 68 | 3 parts polypropylene glycol silicate (av. mol. wt. 800) | 0.1 butyric acid 0.1 ethyl acetate | 0.25 water containing 0.1% sodium phenolate |
| 69 | 2 parts pentaerythritol silicate | 0.1 methyl ethyl ketone | 0.5 water containing 10% sodium silicate |
| 70 | 1 part trimethylol propane silicate | 0.1 acetonitrile | 0.5 water containing 20% castor oil |
| 71 | 3 parts dibutylene glycol silicate | 0.2 acrylonitrile | 0.5 water containing 20% sodium silicate |
| 72 | 4 parts polybutylene silicate | 0.1 allyl chloride, 0.1 methallylchloride | 0.5 water containing 10% silica sol, 0.01% tributylamine |

The following Examples 73 through 81 utilize a polyisocyanate silicate prepolymer which is produced by mixing a polyol with component (B), an organic polyisocyanate, and component (A), an oxidated silicon compound in the amount wherein an excess of polyisocyanate is used in order to produce an isocyanate-terminated polyisocyanate silicate prepolymer; then the mixture is agitated at a temperature of 20° to 60° C. for 10 to 60 minutes.

The various isocyanate-terminated polyisocyanate silicate prepolymers whose ingredients are listed in the following Examples are reacted with component (C) which is 0.25 part by weight of methanol, and component (D) which is 0.25 part by weight of water containing 10% sodium silicate, 5% magnesium oxide, 0.01% N-methyl-morpholine and 0.02% sodium salts of ricinoleic sulphonates by mixing them simultaneously then vigorously agitating for 1 to 10 minutes or until the mixture begins to expand or there is an increase in viscosity, thereby producing rigid cellular polyisocyanate organic silicate products.

| | Parts by Weight of Component B | | Parts by Weight of |
|---|---|---|---|
| Example | Polyisocyanates | Polyol | Component A |
| 73 | 2 parts 2,4-toluene diisocyanate | 0.1 part glycerol, 0.9 castor oil | 1 part hydrated silica |
| 74 | 2 parts 2,6-toluene diisocyanate | 1 part polyethylene glycol (av. mol. wt. —520) | 1 part dry silicic acid gel |
| 75 | 3 parts toluene diisocyanate (80% 2,4-isomer and 20% 2,6-isomer) | 1 part polypropylene glycol (av. mol. wt. — 700) | 2 parts silica sol |
| 76 | 3 parts ("HYLENE T.M.") | 0.5 part dibutylene glycol, 0.5 part polybutylene glycol (av. mol. wt. — 1200) | 1 part silicoformic acid |
| 77 | 4 parts P,P'-dipenyl-methane diisocyanate | 0.5 part pentaerythritol 0.5 triethylene glycol | 1 part silica and 1 part hydrated silica |
| 78 | 3 parts 20% solution of tolyene diisocyanate residue in sulphonated polyphenyl-polymethylene-polyisocyanate with NCO — 30.2% | 2 parts polyester resin, 0.2 part trimethylol propane | 2 parts hydrated silica, 0.2 parts sodium carbonate |
| 79 | 3 parts hexamethylene diisocyanate | 2 parts GLYPTAL resin, 0.1 part glycerol | 1 part silica and 0.1 part sodium hydroxide flakes |

-continued

| Example | Parts by Weight of Component B | | Parts by Weight of Component A |
|---|---|---|---|
| | Polyisocyanates | Polyol | |
| 80 | 3 parts ("crude MDI") | 2 parts polypropylene glycol (av. mol. wt. — 4000) | 1.5 parts hydrated silica |
| 81 | 3 parts ("HYLENE DMM") | 1 part (Poly B-DR45M, Arco Chemical Co.) 1 part ethylene glycol | 1 part hydrated silica |

EXAMPLE 82

About 3 parts by weight of a polyester (which is produced by condensating a mixture of 80% by weight ethylene glycol and 20% by weight propylene glycol and approximately an equimolar amount of adipic acid until it has a molecular weight of about 2000) are reacted with tolylene diisocyanate to form a polyurethane prepolymer having an NCO content of about 3.5. The isocyanate-terminated polyurethane prepolymer in the amount of 4 parts by weight are mixed with 1 part by weight of dry fine granular hydrated silica then agitated at a temperature of 20° to 60° C. for 10 to 60 minutes thereby producing a polyisocyanate silicate prepolymer (components A and B). About 4 parts by weight of the polyisocyanate silicate prepolymer are mixed simultaneously with 0.25 part by weight of acrylonitrile (component C) and 1 part by weight of water containing 10% sodium silicate ($SiO_2:Na_2O$ ratio 3.22:1) are thoroughly mixed at room temperature. The mixture cures in 12 to 16 hours at room temperature to a polyisocyanate organic silicate solid elastomer product. It may be further cured for 1 hour at 158° F.

EXAMPLE 83

About equal parts by weight of castor oil and toluene diisocyanate are reacted to produce a liquid isocyanate-terminated polyurethane prepolymer. About 3 parts by weight of the isocyanate-terminated polyurethane prepolymer (component B) are mixed with 1 part by weight of a fine granular hydrated silica (component A) then agitated at a temperature between 20° to 60° C. at ambient pressure for 10 to 30 minutes thereby producing a polyisocyanate silicate prepolymer (components A and B).

About 4 parts by weight of the polyisocyanate silicate prepolymer are mixed with 0.5 part by weight of furfuryl alcohol (component C) and 2 parts water containing 1 part by weight of cement and 0.2 parts by weight of burnt lime (component D), then vigorously agitated for 1 to 10 minutes or until the mixture begins to expand or thicken, thereby producing a rigid, tough polyisocyanate organic silicate cellular solid product.

EXAMPLE 84

About equal parts by weight of polyethylene glycol (av. mol. wt. 520) and toluene diisocyanate are reacted to produce an isocyanate-terminated prepolymer (component B).

About 3 parts by weight of component (B), 1 part by weight of component (A) (fine granular hydrated silica), 0.2 part by weight of component (C) (allyl chloride) and 0.5 part by weight of component (D) (water containing 2% magnesium oxide, 0.02% triethylenediamine, 3% sulphonated castor oil, 2% ammonium oleate and 0.5% paraffin oil) are mixed then agitated vigorously for 1 to 10 minutes or until the mixture begins to expand; it expands 6 to 10 times its original volume, thereby producing a self-standing tough semi-rigid polyisocyanate organic silicate cellular solid product.

EXAMPLE 85

Polypropylene glycol (av. mol. wt. of 450 to 500) is reacted with toluene diisocyanate in an NCO/OH molar ratio of 2 to 1 to produce a liquid isocyanate-terminated polyurethane prepolymer (component B). About 4 parts by weight of component (B) are mixed with 1 part by weight of fine granular hydrated silica (compound A), 0.2 part by weight of sodium acetate (component C), 1 part by weight of poly (alpha-methyl styrene) polymer, 1 part by weight of water containing 10% sodium silicate having an $Na_2O:SiO$ ratio of about 1:2 (component D), and 1 part by weight of a liquid polypulfide are mixed thoroughly. The mixture cures in a short period of time, thereby producing a white polyisocyanate organic silicate solid elastomer product.

EXAMPLE 86

About 4 parts by weight of component B (a liquid isocyanate-terminated polyurethane prepolymer which is produced by the reaction of a liquid hydroxyl-terminated polybutadiene with 2,4-tolylene diisocyanate and which has a free NCO content of about 4%) and 1 part by weight of fine granular hydrated silica (component A) are mixed then agitated at a temperature between 20° C. to 60° C. for 10 to 30 minutes thereby producing a polyisocyanate silicate prepolymer (components B and A). About 4 parts by weight of the polyisocyanate silicate prepolymer are mixed with: (1) 1 part by weight of water containing 15% potassium silicate ($SiO_2:K_2O$ ratio 2.5:1) and 1% sodium dioctyl sulfosuccinate, (component D), and (2) 0.2 part by weight of ethylene chloride (component C). The mixture stands for 12 to 24 hours, thereby producing a polyisocyanate organic silicate solid elastomer product.

EXAMPLE 87

About 3 parts by weight components (A and B) toluene diisocyanate silicate prepolymer as produced in Example 1, 1 part by weight of component (C), ethylene chloride, and 1 part by weight of component (D), sodium metasilicate pentahydrate, are thoroughly mixed then heated to 50° to 60° C. while agitating until the mixture begins to expand; it expands 6 to 10 times its original volume to produce a tough, rigid polyisocyanate organic silicate cellular solid product.

EXAMPLE 88

About 1 part by weight of dry granular sodium silicate is mixed with 1 part by weight of component (A), fine granular hydrated silica, and 4 parts by weight of component (B), toluene diisocyanate, are thoroughly mixed then heated to about 30° to 40° C. while agitating for 10 to 30 minutes, thereby producing a polyisocyanate silicate prepolymer. About 0.5 part by weight of ethylene chlorohydrin (component C) and 0.5 part by weight of water (component D) are mixed with 3 parts by weight of said polyisocyanate silicate prepolymer (components A and B) then agitated vigorously until foaming starts in 1 to 10 minutes, thereby producing a self-standing tough polyisocyanate organic silicate cellular solid.

Although specific materials and conditions were set forth in the above examples, these were merely illustrative of preferred embodiments of my invention. Various other compositions, such as the typical materials listed above may be used where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:

1. A process for producing polyisocyanate organic silicate cellular solid products by the following steps:
   (a) mixing component (B), an organic polyisocyanate or polyisothiocyanate, with component (A), an oxidated silicon;
   (b) agitating the mixture at 20° to 60° C. for 10 to 30 minutes thereby producing a polyisocyanate silicate prepolymer;
   (c) admixing component (C), an organic additive, and component (D), a curing agent with the polisocyanate silicate prepolymer, and allowing the resultant mixture to react, wherein said organic additive contains from 1 to 9 carbon atoms, has a molecular weight of from 32 to 400 and is selected from the group consisting of monoalcohols, monothioalcohols, monophenols, monothiophenols, halomethyl group containing compounds, nitriles, esters, ethers, thioethers, ketones, nitro-group containing compounds, monocarboxylic acid chlorides, monocarboxylic acid bromides, monosulphonic acids or salts thereof, monocarboxylic acids or salts thereof, and aldehydes, with the proviso that when said organic additive is a monoalcohol, monothioalcohol, monophenol, monothiophenol or monocarboxylic acid, said mixing of (C) and (D) into (A and B) takes place substantially simultaneously.

2. The process of claim 1 wherein the oxidated silicon compound is selected from the group consisting of silicoformic acid, natural occurring oxidated silicon compounds with free silicic acid groups and silica sol.

3. The process of claim 1 wherein said organic additive is selected from the group consisting of monoalcohols, monocarboxylic acids or salts thereof and monosulphonic acids or salts thereof.

4. The process of claim 1 wherein the curing agent is selected from the group consisting of water, water containing 10% to 70% by weight of an alkali metal silicate, water containing 20% to 70% by weight silica sol, water containing 5% to 40% by weight of magnesium oxide in the form of a colloidal dispersion, alkali metal metasilicate pentahydrate selected from the group consisting of sodium metasilicate pentahydrate, potassium metasilicate pentahydrate, lithium metasilicate pentahydrate, and mixtures thereof.

5. The process of claim 1 wherein component (C) is a compound or radical containing a functional group corresponding to one of the following general formulae: ROH, RSH, RCH$_2$Cl, RCH$_2$I, RCN, RNO$_2$, RCOCl, RCOBr, RSO$_2$Cl, RCOOH, RSO$_3$H, RCOO$^-$, RSO$_3^-$, ROR, RCOOR or

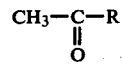

wherein R is CH$_3$—, C$_2$H$_5$— or C$_3$H$_7$—.

6. The process of claim 1, wherein said organic additive is selected from the group consisting of methanol, ethanol, propanol, isopropanol, butanol, isobutanol, t-butyl alcohol and the isomeric pentanols, hexanols and heptanols, cyclohexanol, methylcyclohexanol, methallyl alcohol, allyl alcohol, cyclohexano-methanol, benzyl alcohol, butylmercaptan, phenols, thiophenol and thiocresols; formaldehyde, acetaldehyde, propionaldehyde, butyl aldehyde, pentanals, hexanals, heptanals, octanals and the corresponding semi-acetals and full acetals; formic acid, acetic acid, propionic acid, butyric acid, isobutyric acid, pentanoic acid, hexane carboxylic acid, heptane carboxylic acid, cyclohexane carboxylic acid, benzoic acid, toluic acid; acetyl chloride, propionic acid chloride, acetyl bromide, acid chloride of C$_4$-C$_6$ monocarboxylic acids, methane sulphonic acid chloride, benzenesulphonic acid chloride, p-toluene sulphochloride, o-toluene sulphochloride, carbamic acid chlorides, phenylcarbamic chloride; methyl acetate, ethyl acetate, propyl acetate, butyl acetate, amyl acetate, the methyl and ethyl esters of propionic, butyric, pentanoic, hexanoic, and heptanoic and the corresponding isomeric compounds; methyl ethyl ether, cyclohexyl methyl ether, methyl butyl ether, phenol methyl ether, thiophenol methyl ether, cresol methyl ether, tetrahydrofuranomethyl-methyl ether; ethyl chloride, ethyl bromide, ethyl iodide, n-propyl chloride, n-propyl bromide, n-propyl iodide, isopropyl chloride, isopropyl bromide, isopropyl iodide, butyl chloride, butyl bromide, butyl iodide, benzyl halides, hexahydrobenzyl halides, cyclohexanomethyl chloride, epichlorohydrin, 2-ethyl-2-chloromethyl-oxetane, and 2-ethyl-2-chloromethyloxetane; methyl ether ketone, methyl-isopropyl ketone, methyl-isobutyl ketone, methyl-isoamyl ketone, methyl-n-propyl ketone, methyl-n-butyl ketone, methyl-t-butyl ketone, methyl-furanyl ketone, methyl-tetrahydrofuranyl ketone, methyl-heptyl ketone, ethylhexyl ketone, acetophonone, ω-chloroacetophenone and propiophenone; acetonitrile, propionitrile, butyronitrile, tolunitrile, hexahydrobenzonitrile, acrylonitrile, allylnitrile, methallylnitrile and methacrylonitrile; nitromethane, nitroethane, nitrohexane, nitrobenzene, chlorinated nitrobenzynes, nitrocyclohexanes, brominated nitrobenzenes, benzyl nitrate and nitrotoluene; methanesulphonic acid, ethanesulphonic acid, butanesulphonic acid, benzenesulphonic acid, 2-toluenesulphonic acid, 4-toluenesulphonic acid, chlorsulphonic acid esters and sulphonic acid esters; trimethylphosphite, trimethylphosphate, triethylphosphite and triethylphosphate; calcium lignosulfonate, lignosulfonic acid sodium salts, and lignin sulfate produced by alkali process and mixtures thereof.

7. The process of claim 1 wherein methanol is the organic additive of component (C).

8. The process of claim 1 wherein the proportion by weight of component (B), (polyisocyanate), to component (D), (curing agent) is from 70:1 to 20:80.

9. The process of claim 1 wherein the proportion by mols of component (B), (polyisocyanate), to component (A), (oxidated silicon compound) is fron 2:1 to 1:2.

10. The process of claim 1 wherein component (C) (organic additive), is used in a quantity of from 1% to 30% by weight, based on component (B), (polyisocyanate).

11. The process of claim 1 wherein up to 50% by weight, based on the reaction mixture, of a chemically inert blowing agent boiling within the range of from −25° to 80° C. is added.

12. The process of claim 11 wherein the reaction is accompanied by foaming.

13. The process of claim 1 wherein the mixture contains from 0.001 to 10% by weight, based on the reaction mixture, of an activator selected from the group consisting of tertiary amines, organo-tin compounds and silaamines.

14. The process of claim 1, wherein the mixture contains up to 20% by weight, based on the reaction mixture, of a foam stabilizer.

15. The process of claim 1 wherein the mixture contains up to 20% by weight, based on the reaction mixture, of an emulsifying agent.

16. The process of claim 1 wherein inorganic or organic particulate or pulverulent materials are added to the reaction mixture.

17. The product of the process of claim 1.

18. The process of claim 1 wherein the oxidated silicon compound of component (A) is reacted chemically with a polyol, selected from the group consisting of glycerol, ethylene glycol, propylene glycol, butylene glycol, trimethylene glycol, tetramethylene glycol, pentamethylene glycol, hexamethylene glycol, diethylene glycol, dipropylene glycol, polypropylene glycol, tetraethylene glycol, ether glycols, Bisphenol A, resorcinol, bis (beta-hydroxyethyl) terephthalate, 2-ethyl-2-(hydroxymethyl)-1,3-propanediol, pentaerythritol, quinitol, mannitol, sorbitol, methylglucoside, glucose, starches, fructose, cane sugar, dextrines, dibutylene glycol, polybutylene glycol, polyester resins with free hydroxyl groups, polybutadienes which contain free hydroxyl groups, polycarbonates which contain free hydroxyl groups, trimethylol ethane, trimethylol propane, hexane-1,2,6-triol, polyestor silicates containing free hydroxyl groups, butane-1,2,4-triol, 1,8-octanediol and mixtures thereof, to produce a polyol silicate and in the amount of 1 mol of oxidated silicon compound to 0.5 to 2 mols of the polyol and then reacted with the polyisocyanate in step (a) of claim 1 as component A.

19. The process of claim 1, wherein an alkali catalyst, selected from the group consisting of sodium hydroxide, sodium carbonate, potassium hydroxide, potassium carbonate, sodium silicate and other alkali metal salts of weak acids, and added in the amount of 1% to 10% by weight, based on the oxidated silicon compound, in step (a) of claim 1.

20. The product of the process of claim 18.

21. The process of claim 1 wherein up to 93% by weight, based on weight of the mixture, of a water-binding component is added and wherein the water-binding component is a hydraulic cement, synthetic anhydrite, gypsum or burnt lime.

22. The product of the process of claim 21.

23. The process of claim 1 wherein a dry granular alkali metal silicate, selected from the group consisting of sodium metasilicate pentahydrate and potassium metasilicate pentahydrate in the amount of up to 50% by weight, based on the weight of the oxidated silicon compound (component A) is added with the oxidated silicon compound in step (a) of claim 1.

24. The process of claim 1 wherein an additional step is taken wherein the polyisocyanate (component B) is treated with sulfur trioxide thereby producing a polyisocyanate which contains sulphonic acid and/or suphonate groups.

25. The product of the process of claim 24.

26. A polyisocyanate organic silicate plastic, having high strength, elasticity, dimensional stability with increase in temperature and flame resistance, is prepared by the process which comprises substantially simultaneously mixing and reacting an organic polyisocyanate or polyisothiocyanate, an hydrated silica an organic additive selected from the group consisting of monoalcohols, monothioalcohols, monophenols, and monothiophenols, said organic additive having a molecular weight of up to about 400, and a curing agent selected from the group consisting of water, water containing polyols, and water containing an alkali metal silicate, said polyisocyanate organic silicate plastic being the solid/cellular solid product.

27. The process of claim 1 wherein the components (A), (B), (C) and (D) are substantially simultaneously mixed.

28. The product of the process of claim 27.

29. The process of claim 1 wherein the polyisocyanate (component B) is selected from the group consisting of 2,4-toluene diisocyanate, 2,6-toluene diisocyanate or mixtures thereof.

30. The process of claim 1 wherein an additional step is taken wherein the organic polyisocyanate is reacted with a polyol to produce a liquid isocyanate-terminated polyurethane prepolymer and used as component (B); the polyol is added in the ratio of 1 to 50 mols to 5 to 99 mols of the polyisocyanate.

31. The process of claim 1 wherein a polyol is added to component (D) in the ratio of 1 to 50 mols to 50 to 99 mols of component (B).

32. The process of claim 1 wherein an additional step is taken wherein 10% to 50% by weight of a dry granular alkali metal silicate, selected from the group consisting of potassium metasilicate pentahydrate, and commercial sodium silicate, percentage based on weight of Component A, and is added in step (a) of claim 1.

* * * * *